April 26, 1955 N. CORDIS 2,707,045
BARN CLEANER APPARATUS
Filed Jan. 23, 1950 3 Sheets-Sheet 2

INVENTOR:
NAT CORDIS
BY *Everett A. Johnson*
ATTORNEY

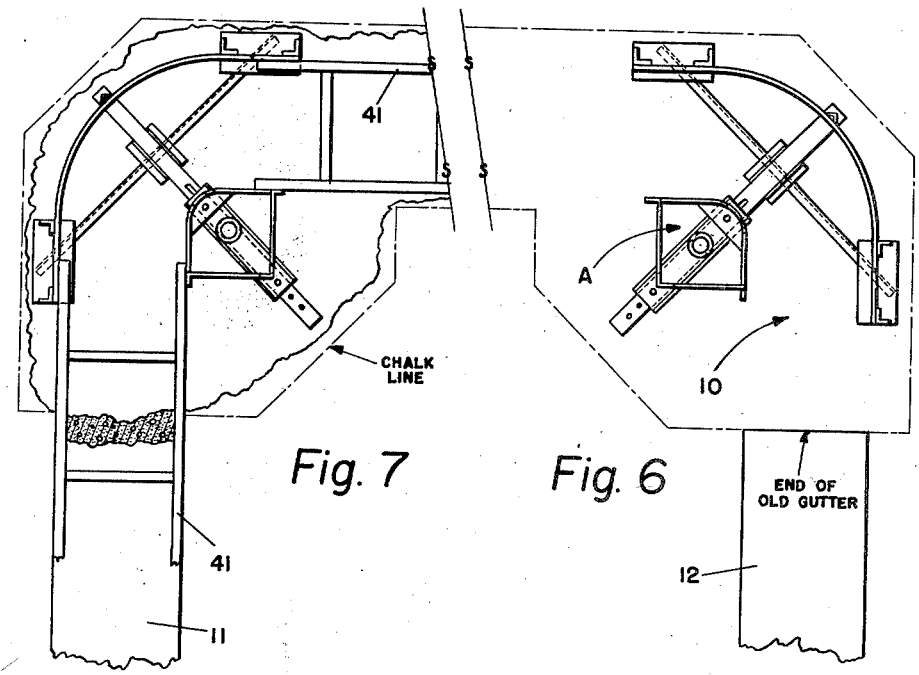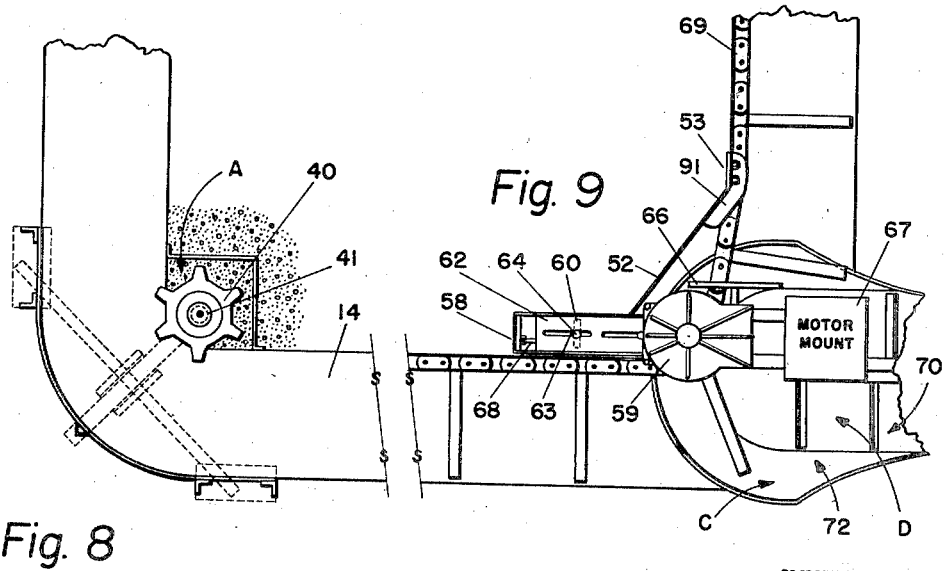

United States Patent Office 2,707,045
Patented Apr. 26, 1955

2,707,045

BARN CLEANER APPARATUS

Nat Cordis, Silver Lake, Wis.

Application January 23, 1950, Serial No. 140,075

9 Claims. (Cl. 198—44)

This invention relates to improvements in mechanical barn cleaners, and more particularly to apparatus of the type which comprises an endless chain conveyor having scraper paddles fixed thereto which travel in a circuitous gutter in the barn floor and conveys refuse within the gutter to a place of discharge. A plurality of idler sprockets are provided for guiding the endless chain and a means is provided for driving the chain and paddles through the gutter.

Systems of this general type are satisfactory when properly installed but heretofore the complicated apparatus and costly installation methods have tended to restrict the use of mechanical barn cleaners to large herds and new buildings. It is, therefore, an object of my invention to provide an apparatus and a system of installation which is adaptable for use in both large and small barns. Another object is to provide an apparatus which does not require specially skilled labor for installation. An additional object is to provide a barn cleaning system which utilizes already existing barn floor gutters. A further object is to provide a compact prefabricated idler sprocket unit and corner form which is adaptable for use in barns having gutters of different depth and width. Still another object is to provide an apparatus adaptable to discharge refuse from any portion of the endless conveyor. A more specific object is to provide prefabricated corner and elevator assemblies which may be installed in a fool-proof, flexible, and economical manner. These and other objects and advantages of my invention will become apparent as the description thereof proceeds.

These and other objects are attained by my providing prefabricated units whereby the existing channels or gutters and floors are utilized and the expense of reconstructing the entire floor and of utilizing skilled installation labor is avoided.

In general, the barn cleaner according to my invention comprises an endless chain conveyor arranged to travel successively through parallel gutters associated with rows of cattle stalls arranged in opposition with a driveway or feed alley between. At one point in the gutter system a hopper is provided for the lower end of a refuse elevator into which the gutter cleaner discharges. The corner forms and idler sprocket assemblies are prefabricated but adjustable.

The installation system includes a "Photoguide" or visual instruction manual for making the necessary excavations in the existing floor, aligning the prefabricated units with the ends of the gutters, and arranging the elevator and adjustable power unit, all without any blueprints or accurate measurement of distances. Furthermore, structural elements of my apparatus are designed for ease of assembly and installation. However, my invention will be better understood by reference to the following detailed description and to the attached drawings forming part thereof wherein like reference characters identify corresponding elements in the several views.

Referring to the drawings.

Figures 6, 7, and 8 are plan views illustrating the progressive steps of installing the adjustable corner assemblies in a barn floor having gutters;

Figure 9 is a top plan view of the drive corner;

Figure 10 is a top plan view showing the drive corner frame and the sectional elevator and hopper;

Figure 11 is a perspective of the drive corner frame showing means for supporting and aligning the hopper and elevator;

Figure 12 is a side view of the lower sections of the elevator, hopper, and elevator hanger; and Figure 13 is a section taken along the line 13—13 in Figure 10.

Figure 1:
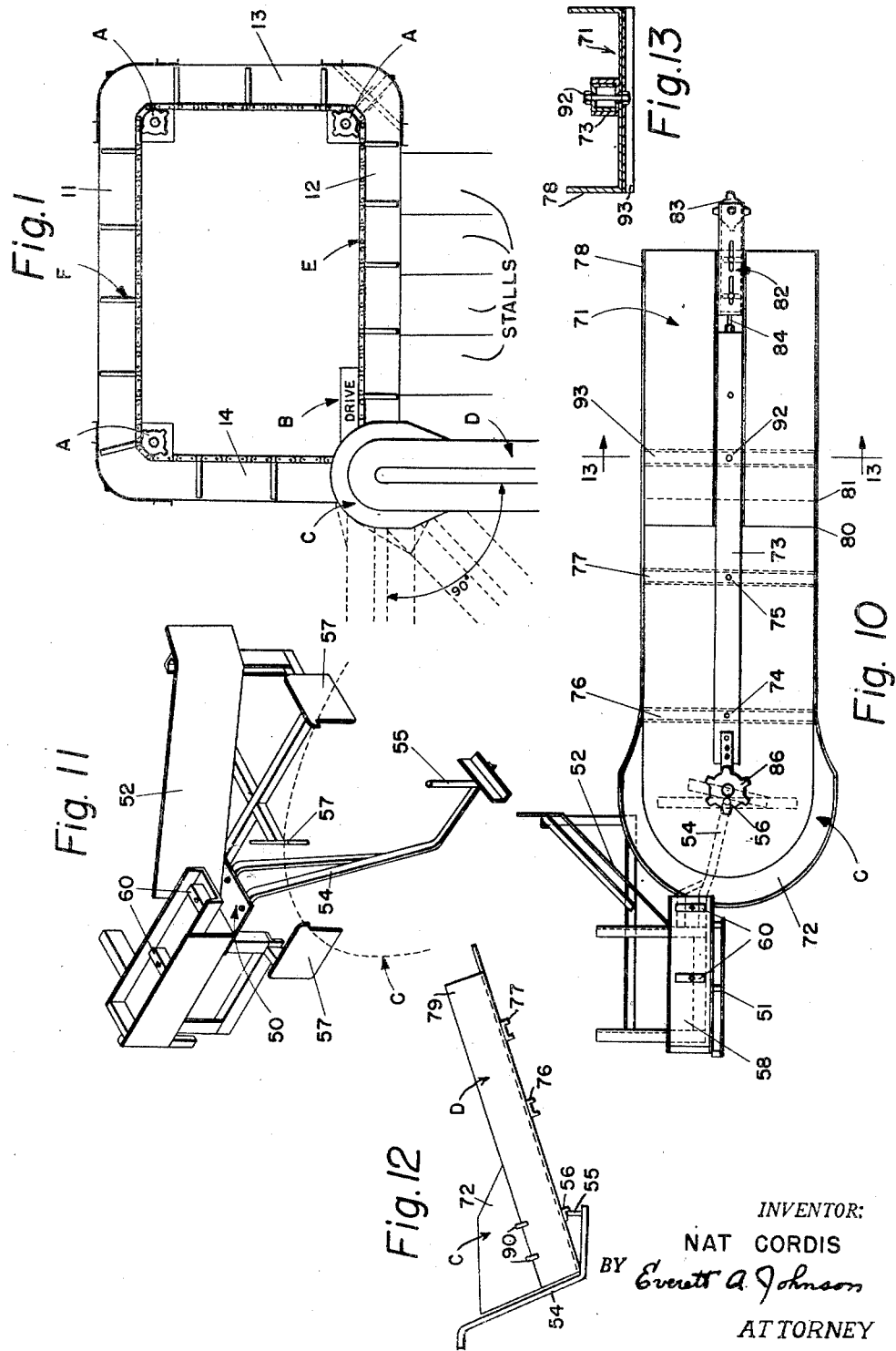
Figure 1 is a schematic plan view showing the installed corner assemblies and adjustable elevator in a typical barn floor.

A general view of the complete installation is schematically shown in Figure 1. From this figure it will be seen that the barn cleaner comprises four main elements; the three corner idler sprocket assemblies A which are complete with the corner gutter forms; the drive unit B with its take up; a hopper C; an elevator-conveyor D; and the conveyor chain E with its paddles F. As will be described hereinafter all the units of the barn cleaner which are to be recessed within or under the concrete surfaces have parts which function as their own steel forms. In the case of the idler assemblies A, these steel forms become a part of the gutter walls when the installation is completed. From the schematic illustration of Figure 1 it will be seen that the elevator D and hopper C can be rotated horizontally through an angle of 90 degrees, i. e. aligned with either a cross gutter or a main gutter running behind the stalls. This permits a wide choice of the point of discharge for the barn cleaner.

Figure 2:
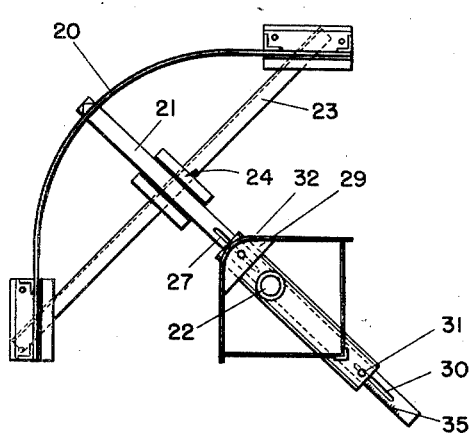
Figure 2 is a top view of a prefabricated corner unit including an adjustable idler sprocket assembly.
Figure 4:
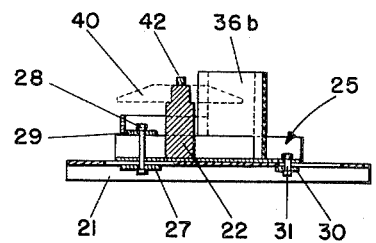
Figure 4 is a vertical section of the idler sprocket assembly taken along the line 4—4 in Figure 2.
Figure 3:
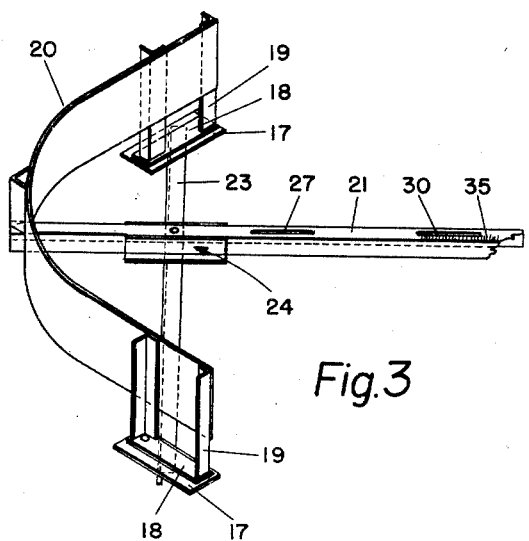
Figure 3 is a perspective of the corner unit with the adjustable idler sprocket assembly removed.
Figure 5:
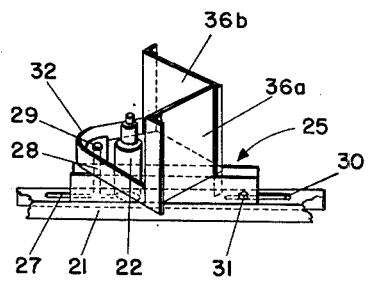
Figure 5 is a perspective of the idler sprocket assembly illustrated in Figures 2 and 3.

In Figures 2, 3, 4 and 5 I have illustrated the details of the construction of the idler sprocket corner assemblies A. Each of the units A includes an outer curved shoe or plate 20 which forms the outer wall of the gutter at the turns as shown in Figure 1. An adjusting guide bar 21 extends radially inward from the base of vertical outer plate 20 and provides means for adjustably mounting the sprocket shaft 22. A brace or tie frame 23 extends between the ends of the curved corner plate 20 and is fixed to the guide bar 21 at 24. An adjustable shaft mounting means 25 is provided for the idler sprocket shaft 26 which is fixed thereto, as by welding. The mounting means 25 is slidable over the guide bar or anchor 21 and guide slots 27 are provided for engaging a bolt or pin 28 which extends downwardly from the anchor plate 29. A second slot 30 in the guide bar 21 cooperates with bolt 31 in the bottom of the adjustable shaft mounting means 25 to lock the mounting means 25 to the guide bar 21. The spacing between the outer plate 20 and an inner curved plate 32 corresponds to the width of the old gutter existing in the barn floor. To determine this spacing a scale 35 can be provided on the anchor bar 21 as shown in Figures 2 and 3. Thus the position of the adjustable mounting means 25 along the bar 21 can be indicated in terms of the selected gutter width.

The corner frame 36 associated with the idler sprocket shaft 26 is shown as comprising intersecting plates 36a and 36b but if desired, a curved plate may be substituted to accommodate the sprocket 40 carried by the shaft 22. The tops of the outer form plate 20 and the corner frame 36 are level with the top of the gutter, i. e. flush with the barn floor, but the upper edge of the inner corner plate 32 is only high enough to form a platform of concrete under the sprocket 40.

To install the corner idler assembly A it is first placed on the barn floor 10 as shown in Figure 6 in the approximate position it will occupy below the concrete gutter. No measurements are required to determine the exact location since the unit A automatically locates itself in the aligned position as the installation proceeds. In this connection and for the purpose of illustration, three idler corner assemblies A have been shown in Figures 6, 7 and 8 in the progressive stages of their installation. By reference to these views and the accompanying text a skilled engineer is not needed for properly installing my novel barn cleaner.

After the adjusted prefabricated unit A has been placed on the barn floor 10 in about the position that it is to be set in the concrete, the next step is to outline with chalk or crayon the area of the old floor to be removed. This is shown in Figure 6. The same procedure is followed at each of the successive corners and the excavation is made within the chalk outline and sand and cinders are then filled into the excavation before arranging the corner idler assembly A therewithin as shown in Figure 7. The open ends of the units A are aligned with the ends of the adjacent gutters 11 and 12 and the opposed open ends of the units A are aligned by wooden pouring forms 41 to define the new gutter walls. The concrete is then poured about the idler sprocket assembly A as shown in Figure 8. Subsequently, the idler sprocket 40 is placed on the idler shaft 22 and retained by idler cover plate 41 and idler cover plate bolt 42.

A prefabricated skeleton frame 50 for the drive unit B, and its association with the hopper C and elevator D is illustrated in Figures 10 and 12 of the drawings. The installed assembly is shown in Figure 9.

The skeleton frame 50 includes a wall plate 51 which forms a portion of the wall of a first gutter and a corner plate 52 which is aligned at 53 with the wall of a second gutter. The height of the wall plate 51 and of the corner plate 52 corresponds to the depth of the gutter. An elevator hanger 54 with a pivot 55 for the lower section 56 of elevator D is suspended from the skeleton frame 50 below the level of the gutter and is buried in the concrete when the hopper C and elevator D are fully installed. As pointed out above, the hopper and elevator assembly may be aligned within 90 degrees of either gutter and the pivot 55 makes this possible. However, the upper portion of the hopper C can be guided by the hopper plates 57 which can be fixed to the skeleton frame 50 as shown in Figure 11. It is contemplated that either or both of these hopper aligning means, i. e. the plates or the pivoted hanger, can be used for orienting the hopper and elevator assembly.

A base plate and slide 58 for the transmission assembly 59 is a unitary portion of the drive corner unit. This base plate and slide 58 is aligned with the back and upper end of the wall plate 51. Details of this element are shown in Figures 9, 10 and 11. The base plate comprises an open ended box-like member having threaded blocks 60 welded to it. These blocks do not extend all the way across the base plate 58 but are spaced from its side walls.

A cooperating mounting for the drive unit comprises an inverted box-like unit 62 which is provided with slots 63 which slidably engage bolts 64 which are threaded into blocks 60. The box unit 62 supports the transmission 65, the drive pulley 66 and the motor mount 67 (see Figure 9).

The drive unit slide 58 and the transmission 59 are set on the skeleton frame or base 50 and bolted in place. Take up 68 is provided for positioning the drive unit slide 58 laterally of the base 50 so as to place the chain 69 under the proper tension. A chain guide 91 (Figure 9) is bolted to the angular plate 52 to prevent the chain 69 from riding up the wall of the gutter in making the turn.

The elevator-conveyor D comprises a lower section 70 and an upper elevator extension 71. The removable hopper 72 completes the discharge unit.

The elevator extension 71 has a main support channel 73 which is placed in the lower section of the elevator 70 and bolted at 74 and 75. Drilled holes in the main support channel fit over the bolts 74 and 75 in the lower elevator section 70 which run through the cross frame members 76 and 77 below the floor of the elevator. The walls 78 of the elevator extension 71 are aligned with the walls 79 of the lower section 70 of the elevator and portions of the bed or floor of the elevator sections overlap at 80–81. At the discharge end of the elevator is provided a motor mount 82, drive sprocket 83 and take-up 84. The motor and drive pulley (neither of which is shown in the drawing) are supported by the slidable mount 82 which in general construction and operation corresponds to that associated with the skeleton frame 50. An elevator chain 85 carrying spaced paddles 87 is fixed about the drive sprocket 83 and idler sprocket 86 for travel along the bed of the elevator.

To install the skeleton frame 50 for the drive unit, the hopper C and elevator D, an excavation is made at the selected point in the gutter circuit. The excavation for the lower section 70 of the elevator should be about 30 inches below the level of the old gutter floor. One end of the hole is rounded and roughly funnel-shaped to accommodate the hopper C. The skeleton frame or drive corner base 50 is placed within the excavation and the plate 51 is aligned with the side wall of the first gutter. After the skeleton frame 50 is in position it is made level in relation to the old gutter floor.

Where the hanger-type support is used, the lower section 70 of the elevator is placed within the excavation and the socket on the bottom thereof is placed over the pivot 55. The socket 56 and the pivot 55 are set at a predetermined angle so that the elevator assembly automatically and correctly positions itself at the desired discharge angle. In other words, the lower section of the elevator and the skeleton frame 50 are attached to each other by the pivot and socket as indicated in Figure 12.

The elevator skirt 72 is added to the elevator section 70 and the welded lugs 90 on the skirt 72 fit securely over the edges of the walls 79. When all elements are in aligned position the concrete is poured around the skeleton frame 50 and behind the hopper 72. Particular attention should be paid to the forming of the cement, with the cement being rounded from the gutter floor down to the top edge of the metal of the elevator skirt which terminates a few inches below the level of the gutter as shown in Figure 9.

Although specific embodiments of my method and apparatus have been described, it should be understood that these are by way of illustration only and that the invention is not limited thereto since alternative embodiments and operating techniques will become apparent to those skilled in the art in view of my disclosure. Accordingly, modifications of my invention are contemplated without departing from the spirit of my described invention or of the scope of the appended claims.

I claim:

1. A prefabricated and adjustable corner for barn cleaners comprising a curved 90 degree corner form plate, a rigid tie means extending between the ends of said curved plate, an adjusting bar frame extending radially inward from the bottom of said plate and fixed to said tie means, a sprocket shaft, an adjustable assembly for said shaft, and means for fixing said assembly along said adjusting frame in spaced relation to said corner plate.

2. A prefabricated and adjustable idler corner for barn cleaners comprising a curved 90 degree corner form plate, a rigid tie means extending between the ends of the bottom of said curved plate, a radially extending frame member intersecting said tie means and fixed to an intermediate portion of said plate, an idler sprocket shaft, an adjustable assembly for said shaft, and means for fixing said assembly above said frame member in radially spaced relation to said corner plate.

3. A prefabricated barn cleaner corner unit which is adjustable to different widths of barn floor gutters, the combination which includes a curved corner plate describing a 90 degree arc, an adjusting bar frame extending radially inward of said plate, a tie member intersecting said frame and fixed to the ends of said plate, an idler sprocket shaft means adjustably mounted on an assembly slidable on said adjusting bar frame, and anchor means for fixing said assembly to said adjusting bar frame at the desired spacing corresponding to the gutter width.

4. A prefabricated barn cleaner corner unit which is adjustable to different widths of barn floor gutters, the combination which includes an outer curved corner plate describing a 90 degree arc, a radial adjusting bar frame substantially bisecting said arc, a tie member intersecting said frame and fixed to the ends of said plate, an idler sprocket shaft means including an inner corner plate, and anchor means for adjustably fixing said shaft means to said adjusting bar frame at the desired spacing corresponding to the gutter width.

5. A prefabricated and adjustable corner for barn cleaners comprising a curved corner plate adapted to form a portion of the outer side wall of a gutter system in a barn floor, an adjusting bar frame extending radially inward from said plate and having one end fixed thereto, a tie means fixed to said bar frame at a point removed from said plate and adjustably fixed to spaced portions of said curved plate, an adjustable sprocket assembly slidably associated with said adjusting bar frame, and means for fixing said assembly along said adjusting bar frame in spaced relation to said curved plate.

6. An apparatus associated with a plurality of series-connected gutters in a barn floor comprising a plurality of prefabricated and adjustable idler sprocket assemblies recessed below the barn floor and gutter bottom at noncolinear portions of said gutters, a single endless conveyor chain about said idler sprockets and provided with spaced cleaning paddles extending therefrom for travel through said gutters, an adjustable drive assembly for said conveyor, a manure hopper disposed in the path of said paddles below a discharge portion of the said gutters, and an elevator means associated with said hopper, said elevator means and hopper being pivotably suspended from said drive assembly for horizontal adjustment with reference to said gutters.

7. A drive corner unit for an endless conveyor-type barn cleaner including a skeleton frame adapted to be recessed within the barn floor, a guide plate on said skeleton frame adapted to be aligned with an inner wall of a barn floor gutter, an angular corner guide plate carried by said skeleton frame and having one end adapted to merge with the wall of a second gutter in the barn floor, a drive means including a transmission, a drive pulley and a driven sprocket, an adjustable base for said drive means adjacent to said gutter within the barn floor, a chain guide fixed to said angular corner guide plate at the point of merging with said second gutter, an elevator means including a manure hopper adjustably mounted on said skeleton frame below the floor of said gutters, and an elevator support hanger suspended from said skeleton frame and comprising a laterally extending member having an upstanding pivot adapted to engage the bottom of the said elevator means.

8. A barn cleaner apparatus comprising a plurality of idler corners and a drive corner within a circuitous barn floor gutter system having a place of discharge below said drive corner and an endless conveyor chain about sprockets at said drive and idler corners, each said idler corner comprising a prefabricated and adjustable corner including a curved corner plate forming a portion of the outer wall of the gutter system in the barn floor, an adjusting bar frame extending radially inward from said plate and having one end fixed thereto, a tie means fixed to said bar frame at a point spaced from said plate and terminating adjacent opposite ends of said plate, an adjustable sprocket assembly slidably carried by said adjusting bar frame, and means for fixing said assembly along said adjusting bar frame means in spaced relation to said curved plate.

9. In an apparatus for installation in association with an endless gutter in a barn floor including prefabricated and adjustable idler sprocket assemblies, the improvement comprising a curved upstanding plate forming an outer corner wall at an intersection in said gutter, an adjusting bar frame means extending inwardly from said upstanding curved plate across the intersection, an adjustable idler sprocket mount slidably fixed to said adjusting bar frame means, and an idler sprocket on said mount.

References Cited in the file of this patent

UNITED STATES PATENTS

| | | |
|---|---|---|
| 1,498,991 | Blenko | June 24, 1924 |
| 1,632,946 | Brunig | June 21, 1927 |
| 1,698,529 | Bennett | Jan. 8, 1929 |
| 1,800,814 | Boldt | Apr. 14, 1931 |
| 2,383,932 | Brunner | Sept. 4, 1945 |
| 2,513,706 | Baehr | July 4, 1950 |
| 2,538,144 | Carretto | Jan. 16, 1951 |
| 2,544,191 | Tomfohrde | Mar. 6, 1951 |
| 2,578,592 | Pile | Dec. 11, 1951 |